(12) United States Patent
Ohno et al.

(10) Patent No.: US 7,790,122 B2
(45) Date of Patent: Sep. 7, 2010

(54) HONEYCOMB STRUCTURE, HONEYCOMB STRUCTURE ASSEMBLY, AND HONEYCOMB CATALYST

(75) Inventors: Kazushige Ohno, Ibi-gun (JP); Masafumi Kunieda, Ibi-gun (JP); Kazutake Ogyu, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 1340 days.

(21) Appl. No.: 11/094,180

(22) Filed: Mar. 31, 2005

(65) Prior Publication Data

US 2005/0227869 A1 Oct. 13, 2005

Related U.S. Application Data

(63) Continuation of application No. PCT/JP2005/001871, filed on Feb. 2, 2005, now abandoned.

(30) Foreign Application Priority Data

Feb. 4, 2004 (JP) ............................. 2004-028186

(51) Int. Cl.
*B01D 50/00* (2006.01)
(52) U.S. Cl. ...................................... 422/180
(58) Field of Classification Search ................ 422/168, 422/177, 180
See application file for complete search history.

(56) References Cited

U.S. PATENT DOCUMENTS 5,106,802 A * 4/1992 Horiuchi et al. ............... 502/65

| | | |
|---|---|---|
| 2002/0183191 A1 | 12/2002 | Faber et al. |
| 2005/0266992 A1 | 12/2005 | Ohno et al. |
| 2006/0172113 A1 | 8/2006 | Kunieda |
| 2006/0177629 A1 | 8/2006 | Kunieda |
| 2006/0263574 A1 | 11/2006 | Tsunekawa et al. |
| 2006/0292044 A1 | 12/2006 | Ohno et al. |
| 2006/0292330 A1 | 12/2006 | Ohno et al. |
| 2006/0292331 A1 | 12/2006 | Ohno et al. |
| 2006/0292332 A1 | 12/2006 | Ohno et al. |
| 2006/0292333 A1 | 12/2006 | Ohno et al. |

(Continued)

FOREIGN PATENT DOCUMENTS

CN 1414883 A 4/2003

(Continued)

OTHER PUBLICATIONS

Claus-Dieter Vogt, et al., "Development Status of Ceramic Supported Catalyst", Material Aspects in Automotive Catalytic Converters, Chapter III : Ceramics, XP-002326699, 2002, pp. 173-185.

(Continued)

*Primary Examiner*—Tom Duong
(74) *Attorney, Agent, or Firm*—Oblon, Spivak, McClelland, Maier & Neustadt, L.L.P.

(57) ABSTRACT

A honeycomb structure having multiple through holes includes at least ceramic particles and an inorganic binder. A wall thickness of each wall between adjoining through holes, on which a catalyst component is carried, is designed to be not greater than about 0.25 mm. The honeycomb structure satisfies a relation of $Y \geqq 250 \times X + 22500$ ($50 \leqq X \leqq 80$), where X denotes an aperture ratio (%) of a honeycombed face of the honeycomb structure perpendicular to the multiple through holes and Y denotes a specific surface area per unit volume ($m^2/L$) of the honeycomb structure.

15 Claims, 8 Drawing Sheets

U.S. PATENT DOCUMENTS

| | | |
|---|---|---|
| 2006/0292334 A1 | 12/2006 | Ohno et al. |
| 2006/0292335 A1 | 12/2006 | Ohno et al. |
| 2006/0292336 A1 | 12/2006 | Ohno et al. |
| 2006/0292337 A1 | 12/2006 | Ohno et al. |
| 2006/0292338 A1 | 12/2006 | Ohno et al. |
| 2006/0292339 A1 | 12/2006 | Ohno et al. |
| 2006/0292340 A1 | 12/2006 | Ohno et al. |
| 2006/0292341 A1 | 12/2006 | Ohno et al. |
| 2006/0292342 A1 | 12/2006 | Ohno et al. |
| 2006/0292393 A1 | 12/2006 | Kunieda |
| 2007/0004592 A1 | 1/2007 | Ohno et al. |
| 2007/0004593 A1 | 1/2007 | Ohno et al. |
| 2007/0039295 A1 | 2/2007 | Ohno |
| 2007/0077190 A1 | 4/2007 | Ohno |
| 2008/0118701 A1 | 5/2008 | Ohno et al. |
| 2008/0119355 A1 | 5/2008 | Ohno et al. |
| 2008/0176028 A1 | 7/2008 | Ohno et al. |
| 2008/0187713 A1 | 8/2008 | Ohno et al. |
| 2008/0241003 A1 | 10/2008 | Ido et al. |
| 2008/0241005 A1 | 10/2008 | Ido et al. |
| 2008/0241008 A1 | 10/2008 | Ido et al. |
| 2008/0260991 A1 | 10/2008 | Konstandopoulos et al. |
| 2009/0095416 A1 | 4/2009 | Kunieda et al. |

FOREIGN PATENT DOCUMENTS

| | | |
|---|---|---|
| EP | 0 040 980 A1 | 12/1981 |
| EP | 0 622 530 A1 | 11/1994 |
| EP | 0 816 065 A1 | 1/1998 |
| EP | 1142619 A1 * | 10/2001 |
| EP | 1 338 326 A1 | 8/2003 |
| JP | 5-213681 | 8/1993 |
| JP | 08-028246 | 1/1996 |
| JP | 10-263416 | 10/1998 |
| JP | 2003-518434 | 6/2003 |
| JP | 2003-245547 | 9/2003 |
| WO | WO 01/47634 A1 | 7/2001 |

OTHER PUBLICATIONS

"Tier 2/LEV II Emission Control Technologies for Light-Duty Gasoline Vehicles", Manufactures of Emission Controls Association, XP-002326698, Aug. 2003, pp. 1-41.
U.S. Appl. No. 12/238,057, filed Sep. 25, 2008.
U.S. Appl. No. 12/245,821, filed Oct. 6, 2008.
U.S. Appl. No. 12/246,899, filed Oct. 7, 2008.
U.S. Appl. No. 12/246,881, filed Oct. 7, 2008.
U.S. Appl. No. 12/239,342, filed Sep. 26, 2008.
U.S. Appl. No. 12/246,913, filed Oct. 7, 2008.
U.S. Appl. No. 12/246,869, filed Oct. 7, 2008.
U.S. Appl. No. 12/248,647, filed Oct. 9, 2008.
U.S. Appl. No. 12/248,675, filed Oct. 9, 2008.
U.S. Appl. No. 11/925,394, filed Oct. 26, 2007, Ido, et al.
U.S. Appl. No. 11/853,658, filed Sep. 11, 2007, Ido.
U.S. Appl. No. 11/928,546, filed Oct. 30, 2007, Ohno, et al.
U.S. Appl. No. 11/414,361, filed May 1, 2006, Ohno.
U.S. Appl. No. 11/494,645, filed Jul. 28, 2006, Tsunekawa et al.
U.S. Appl. No. 11/510,590, filed Aug. 28, 2006, Kunieda.
U.S. Appl. No. 11/317,199, filed Dec. 27, 2005, Kunieda.
U.S. Appl. No. 11/342,636, filed Jan. 31, 2006, Kunieda.
U.S. Appl. No. 11/320,958, filed Dec. 30, 2005, Ohno, et al.
U.S. Appl. No. 11/320,974, filed Dec. 30, 2005, Ohno, et al.
U.S. Appl. No. 11/321,880, filed Dec. 30, 2005, Ohno, et al.
U.S. Appl. No. 11/321,882, filed Dec. 30, 2005, Ohno, et al.
U.S. Appl. No. 11/368,446, filed Mar. 7, 2006, Ohno, et al.
U.S. Appl. No. 11/367,332, filed Mar. 6, 2006, Ohno, et al.
U.S. Appl. No. 11/370,933, filed Mar. 9, 2006, Ohno, et al.
U.S. Appl. No. 11/371,068, filed Mar. 9, 2006, Ohno, et al.
U.S. Appl. No. 11/298,833, filed Dec. 12, 2005, Ohno, et al.
U.S. Appl. No. 11/298,510, filed Dec. 12, 2005, Ohno, et al.
U.S. Appl. No. 11/320,689, filed Dec. 30, 2005, Ohno, et al.
U.S. Appl. No. 11/296,494, filed Dec. 8, 2005, Ohno, et al.
U.S. Appl. No. 11/355,660, filed Jan. 20, 2006, Ohno, et al.
U.S. Appl. No. 11/474,287, filed Jun. 26, 2006, Ohno, et al.

* cited by examiner

| | Ceramic Particles | Wall Thickness mm | Aperture Ratio(X) % | Dimensions of Honeycomb Structure | Cell Density cells/cm2 (cpsi) | | Firing Temprature °C | Firing Time h |
|---|---|---|---|---|---|---|---|---|
| Example 1 | Alumina | 0.25 | 60 | 34.3mm×34.3mm | 62 | (400) | 800 | 2 |
| Example 2 | Alumina | 0.25 | 50 | 34.3mm×34.3mm | 140 | (900) | 900 | 5 |
| Example 3 | Alumina | 0.25 | 60 | 34.3mm×34.3mm | 62 | (400) | 900 | 3 |
| Example 4 | Alumina | 0.25 | 80 | 34.3mm×34.3mm | 15.5 | (100) | 800 | 2 |
| Example 5 | Alumina | 0.25 | 50 | 34.3mm×34.3mm | 140 | (900) | 700 | 1 |
| Example 6 | Alumina | 0.25 | 80 | 34.3mm×34.3mm | 15.5 | (100) | 600 | 1 |
| Example 7 | Alumina | 0.20 | 60 | 34.3mm×34.3mm | 124 | (800) | 800 | 2 |
| Example 8 | Alumina | 0.20 | 50 | 34.3mm×34.3mm | 217 | (1400) | 900 | 5 |
| Example 9 | Alumina | 0.20 | 60 | 34.3mm×34.3mm | 124 | (800) | 900 | 3 |
| Example 10 | Alumina | 0.20 | 80 | 34.3mm×34.3mm | 23.3 | (150) | 800 | 2 |
| Example 11 | Alumina | 0.20 | 50 | 34.3mm×34.3mm | 217 | (1400) | 700 | 1 |
| Example 12 | Alumina | 0.20 | 80 | 34.3mm×34.3mm | 23.3 | (150) | 600 | 1 |
| Comparative Example 1 | Alumina | 0.25 | 40 | 34.3mm×34.3mm | 217 | (1400) | 1000 | 3 |
| Comparative Example 2 | Alumina | 0.25 | 40 | 34.3mm×34.3mm | 217 | (1400) | 900 | 8 |
| Comparative Example 3 | Alumina | 0.25 | 50 | 34.3mm×34.3mm | 140 | (900) | 1000 | 1 |
| Comparative Example 4 | Alumina | 0.25 | 60 | 34.3mm×34.3mm | 62 | (400) | 900 | 4 |
| Comparative Example 5 | Alumina | 0.25 | 80 | 34.3mm×34.3mm | 15.5 | (100) | 800 | 3 |
| Comparative Example 6 | Alumina | 0.25 | 85 | 34.3mm×34.3mm | 7.8 | (50) | 800 | 1 |
| Comparative Example 7 | Alumina | 0.25 | 85 | 34.3mm×34.3mm | 7.8 | (50) | 600 | 1 |
| Comparative Example 8 | Cordierite + Alumina | 0.25 | 56 | 34.3mm×34.3mm | 62 | (400) (Hexagonal Cells) | 800 | 2 |
| Comparative Example 9 | Alumina | 0.30 | 60 | 34.3mm×34.3mm | 46.5 | (300) | 800 | 2 |
| Comparative Example 10 | Alumina | 0.30 | 50 | 34.3mm×34.3mm | 93 | (600) | 900 | 5 |
| Comparative Example 11 | Alumina | 0.30 | 60 | 34.3mm×34.3mm | 46.5 | (300) | 900 | 3 |
| Comparative Example 12 | Alumina | 0.30 | 80 | 34.3mm×34.3mm | 10.9 | (70) | 800 | 2 |
| Comparative Example 13 | Alumina | 0.30 | 50 | 34.3mm×34.3mm | 93 | (600) | 700 | 1 |
| Comparative Example 14 | Alumina | 0.30 | 80 | 34.3mm×34.3mm | 10.9 | (70) | 600 | 1 |

| | Ceramic Particles | Wall Thickness mm | Aperture Ratio(X) % | Specific Surface Area (Y) m²/l | 250X +22500 | Light-off Temperatures CO °C | Light-off Temperatures HC °C |
|---|---|---|---|---|---|---|---|
| Example 1 | Alumina | 0.25 | 60 | 55000 | 37500 | 110 | 158 |
| Example 2 | Alumina | 0.25 | 50 | 35000 | 35000 | 124 | 169 |
| Example 3 | Alumina | 0.25 | 60 | 37500 | 37500 | 122 | 165 |
| Example 4 | Alumina | 0.25 | 80 | 42500 | 42500 | 118 | 162 |
| Example 5 | Alumina | 0.25 | 50 | 52500 | 35000 | 113 | 160 |
| Example 6 | Alumina | 0.25 | 80 | 57000 | 42500 | 108 | 156 |
| Example 7 | Alumina | 0.20 | 60 | 55000 | 37500 | 108 | 155 |
| Example 8 | Alumina | 0.20 | 50 | 35000 | 35000 | 121 | 165 |
| Example 9 | Alumina | 0.20 | 60 | 37500 | 37500 | 119 | 162 |
| Example 10 | Alumina | 0.20 | 80 | 42500 | 42500 | 116 | 161 |
| Example 11 | Alumina | 0.20 | 50 | 52500 | 35000 | 109 | 157 |
| Example 12 | Alumina | 0.20 | 80 | 57000 | 42500 | 107 | 155 |
| Comparative Example 1 | Alumina | 0.25 | 40 | 32500 | 32500 | 142 | 185 |
| Comparative Example 2 | Alumina | 0.25 | 40 | 45000 | 32500 | 132 | 179 |
| Comparative Example 3 | Alumina | 0.25 | 50 | 30000 | 35000 | 146 | 190 |
| Comparative Example 4 | Alumina | 0.25 | 60 | 35000 | 37500 | 126 | 172 |
| Comparative Example 5 | Alumina | 0.25 | 80 | 40000 | 42500 | 126 | 173 |
| Comparative Example 6 | Alumina | 0.25 | 85 | 43000 | 43750 | 127 | 175 |
| Comparative Example 7 | Alumina | 0.25 | 85 | 50000 | 43750 | 140 | 186 |
| Comparative Example 8 | Cordierite + Alumina | 0.25 | 56 | 27000 | 36500 | 160 | 200 |
| Comparative Example 9 | Alumina | 0.30 | 60 | 55000 | 37500 | 125 | 170 |
| Comparative Example 10 | Alumina | 0.30 | 50 | 35000 | 35000 | 140 | 182 |
| Comparative Example 11 | Alumina | 0.30 | 60 | 37500 | 37500 | 138 | 181 |
| Comparative Example 12 | Alumina | 0.30 | 80 | 42500 | 42500 | 128 | 176 |
| Comparative Example 13 | Alumina | 0.30 | 50 | 52500 | 35000 | 128 | 175 |
| Comparative Example 14 | Alumina | 0.30 | 80 | 57000 | 42500 | 126 | 172 |

HONEYCOMB STRUCTURE, HONEYCOMB STRUCTURE ASSEMBLY, AND HONEYCOMB CATALYST

CROSS REFERENCE TO RELATED APPLICATION

This is a continuation of Application No. PCT/JP2005/001871, filed on Feb. 2, 2005, now abandoned.

BACKGROUND ART

1. Technical Field

The present invention relates to a honeycomb structure, a honeycomb structure assembly, and a honeycomb catalyst.

This application claims benefit of priority to Japanese Patent Application No.2004-028186, filed on Feb. 4, 2004, the contents Of which are incorporated by reference herein.

2. Prior Art to be Disclosed

A honeycomb catalyst including a honeycomb structure with a catalyst component carried thereon is used to convert the exhaust gas of vehicles. The honeycomb catalyst is conventionally manufactured by making a material of a high specific surface area, for example, active alumina, and a catalyst metal, for example, platinum, carried on the surface of an integral cordierite honeycomb structure of low thermal expansion characteristic. An alkaline earth metal, such as Ba, is also carried on the honeycomb structure as a NOx storage agent to store NOx in an excess oxygen atmosphere of, for example, lean burn engines and Diesel engines. The enhanced conversion performance is attained by raising the potential for bringing the exhaust gas into contact with the noble metal catalyst and the NOx storage agent. For this purpose, it is required to increase the specific surface area of the carrier while decreasing the particle size of the noble metal and making the particles of the noble metal highly dispersed. A simple increase in quantity of the material having the high specific surface area, for example, active alumina, may, however, only increase the thickness of an alumina layer, while not significantly increasing the contact potential and undesirably heightening a pressure loss. One proposed technique accordingly specifies the shape of cells, the cell density, and the wall thickness to enhance the contact potential (see, for example, Japanese Patent Laid-Open Publication No. 10-263416). Another known honeycomb structure is manufactured by extrusion molding a material of a high specific surface area with inorganic fibers and an inorganic binder (see, for example, Japanese Patent Laid-Open Publication No. 5-213681). Still another proposed technique regulates the thickness of each wall between adjoining through holes (hereafter referred to as the wall thickness), the length in a gas flow direction, the length of each through hole, and the aperture ratio to preset values in an extrusion-molded honeycomb structure made of a material having a high specific surface area and a catalyst component carried thereon (see, for example, Japanese Patent Laid-Open Publication No. 2003-245547).

The prior art honeycomb structures cited above, however, have some drawbacks. The cordierite honeycomb structure disclosed in Japanese Patent Laid-Open Publication No. 10-263416 has the material having the high specific surface area, for example, active alumina, and the catalyst component, for example, platinum, carried on the surface thereof. This prior art technique specifies the shape of cells, the cell density, and the wall thickness to increase the specific surface area of the catalyst carrier and thereby enhance the potential for bringing the exhaust gas into contact with the catalyst component. This prior art technique, however, has the problem of a pressure loss and thereby does not sufficiently increase the specific surface area of the catalyst carrier. The insufficient specific surface area of the catalyst carrier results in insufficient dispersion of the catalyst component and poor conversion performance of the exhaust gas after heat aging. A significant increase in quantity of the catalyst component and size growth of the catalyst carrier may compensate for such insufficiency. Platinum and other noble metals are, however, very expensive and moreover limited precious resources. The size increase of the catalyst carrier is not desirable when the honeycomb structure with the catalyst is mounted on a limited space, such as an automobile.

The honeycomb structure disclosed in Japanese Patent Laid-Open Publication No. 5-213681 is obtained by extrusion molding the material having a high specific surface area with the inorganic fibers and the inorganic binder. This gives a catalyst carrier of a high specific surface area and attains sufficiently high dispersion of a catalyst component. The simple increase in specific surface area of the catalyst carrier may, however, fail to increase the potential for bringing the exhaust gas into contact with the catalyst component. This prior art technique may thus not attain efficient conversion of the exhaust gas.

The technique disclosed in Japanese Patent Laid-Open Publication No. 2003-245547 gives some suggestions about the relation between the catalytic performance and some parameters of the honeycomb structure, which include the wall thickness, the length in the gas flow direction, the length of each through hole, and the aperture ratio of the honeycomb structure. Simple regulation of these parameters may, however, fail to efficiently convert the exhaust gas.

The contents of Japanese Patent Laid-Open Publication No. 10-263416, Japanese Patent Laid-Open Publication No. 5-213681, and Japanese Patent Laid-Open Publication No. 2003-245547 are incorporated herein by reference in their entity.

SUMMARY OF THE INVENTION

Embodiments of the present invention provide a honeycomb structure, a honeycomb structure assembly, and a honeycomb catalyst, which bring the exhaust gas in sufficient contact with a catalyst component and thereby efficiently convert the exhaust gas.

The present invention is directed to a honeycomb structure having multiple through holes, wherein a wall thickness of each wall between adjoining through holes is not greater than about 0.25 mm, and a relation of $Y \geq 250 \times X + 22500$ ($50 \leq X \leq 80$) is satisfied, where X denotes an aperture ratio of a honeycombed face of the honeycomb structure perpendicular to the multiple through holes and Y denotes a specific surface area per unit volume of the honeycomb structure. The honeycomb structure of this invention has the wall thickness, the aperture ratio of the honeycombed face perpendicular to the through holes, and the specific surface area per unit volume specified above.

In the honeycomb structure of the invention, the wall thickness is preferably not less than about 0.10 mm, and not more than about 0.25 mm.

In the honeycomb structure of the invention, number of the through holes per unit cross section area is preferably about 15.5 to 186/cm$^2$.

The honeycomb structure of the invention preferably includes at least ceramic particles and an inorganic binder. More preferably, the honeycomb structure of the invention includes about 30 to 90% by weight of the ceramic particles and about 5 to 50% by weight of the inorganic binder as a solid content. The specific surface area per unit volume is preferably not less than about 35,000 m²/L and not greater than about 70,000 m²/L.

The present invention is also directed to a honeycomb structure assembly which includes at least two honeycomb structures described above and a seal layer that joins adjacent honeycomb structures with each other via respective closed outer faces of the honeycomb structures that are different from respective honeycombed faces of the honeycomb structures perpendicular to the multiple through holes. The seal layer preferably has a thickness in a range of about 0.5 to 2 mm.

The present invention is further directed to a honeycomb catalyst, where a catalyst component is carried on a honeycomb structure of the invention. The catalyst component preferably includes at least one selected among noble metals, alkali metals, alkaline earth metals, and oxides. The honeycomb catalyst is preferably used to convert exhaust gas of a vehicle.

DETAILED DESCRIPTION OF THE INVENTION

The present invention is directed to a honeycomb structure having multiple through holes, where a wall thickness of each wall between adjoining through holes is not greater than about 0.25 mm. The honeycomb structure satisfies a relation of Y≧250×X+22500 (50≦X≦80), where X denotes an aperture ratio of a honeycombed face of the honeycomb structure perpendicular to the multiple through holes and Y denotes a specific surface area per unit volume of the honeycomb structure.

The honeycomb structure of this invention has the wall thickness, the aperture ratio of the honeycombed face perpendicular to the through holes, and the specific surface area per unit volume specified above. In general, the honeycomb structure is required to increase the potential for bringing the exhaust gas into contact with the catalyst component carried on the honeycomb structure. The effective measures for this purpose increase the specific surface area of the catalyst component and decrease the particle diameter of the catalyst component to attain the sufficiently high dispersion. Even when the amount of the catalyst component is fixed, the high dispersion increases the specific surface area of the catalyst component and thus enhances the potential for bringing the exhaust gas into contact with the catalyst component. In the honeycomb structure, the exhaust gas flows inside the through holes along the surface of the walls. The exhaust gas is diffused to gradually enter the inside of the walls. The exhaust gas, however, has a limit of distance from the wall surface to be in contact with the catalyst component. The excessively large wall thickness relatively increases the fraction of the catalyst component that is carried on the deep inside of the walls and does not contribute to conversion of the exhaust gas. The excessively large wall thickness accordingly results in a poor conversion efficiency of the exhaust gas. The excessively high aperture ratio causes the exhaust gas to pass through the honeycomb structure without coming into contact with the catalyst component. This may undesirably lower the conversion performance. The excessively high aperture ratio also deteriorates the strength of the honeycomb structure. The excessively low aperture ratio, on the other hand, enhances a pressure loss, while raising the flow rate of the exhaust gas passing through the through holes of the honeycomb structure. The raised flow rate decreases the potential for bringing the exhaust gas into contact with the catalyst component and may thus undesirably lower the conversion performance. An increase in aperture ratio may lead to decrease the total area of the walls in the honeycomb structure with the catalyst component carried thereon for conversion. It is accordingly required to raise the relative speed of adsorption of the exhaust gas onto the catalyst component. The effective measure for this purpose increases the specific surface area per unit volume of the honeycomb structure. Specification of the wall thickness, the aperture ratio, and the specific surface area per unit volume in adequate ranges is thus essential to heighten the potential of bringing the exhaust gas into contact with the catalyst component carried on the honeycomb structure and efficiently convert the exhaust gas. As the results of the intensive studies, the inventors of the present invention have found that the exhaust gas is sufficiently in contact with the catalyst component and is efficiently converted when the wall thickness is not greater than about 0.25 mm and Relation (1) given below is satisfied:

$$Y \geq 250 \times X + 22500 (50 \leq X \leq 80) \qquad (1)$$

where X denotes the aperture ratio and Y denotes the specific surface area per unit volume.

The honeycomb structure of the invention preferably includes at least ceramic particles and an inorganic binder. The honeycomb structure of the invention more preferably includes ceramic particles, an inorganic reinforcing agent, and an inorganic binder. The ceramic particles as the base of the catalyst carrier are solidified by the inorganic binder. The inorganic binder gives at least the sufficient strength for maintaining the shape and forms the honeycomb structure having a high specific surface area per unit volume. The inorganic reinforcing agent reinforces the structure to give the higher strength and forms the honeycomb structure having a high specific surface area per unit volume. The catalyst component is widely dispersed over the whole honeycomb structure. Even when the ceramic particles are not sufficiently sintered to keep the high specific surface area per unit volume, such high dispersion enables the shape to be kept even under some thermal shocks or vibrations.

The present invention is also directed to a honeycomb structure assembly obtained by joining at least two honeycomb structures described above with one another by means of at least one seal layer. The seal layer joins adjacent honeycomb structures with each other via respective closed outer faces of the honeycomb structures that are different from respective honeycombed faces of the honeycomb structures perpendicular to the multiple through holes. In the honeycomb structure assembly of the invention, the honeycomb structures described above are joined with one another via the seal layers. This ensures the high specific surface area per unit volume to attain high dispersion of the catalyst component, while enhancing the resistances against thermal shocks and vibrations. It is presumed that even when an abrupt temperature change causes a significant temperature distribution in the honeycomb structure assembly, each honeycomb structure has a relatively small temperature difference, and that the seal layers desirably relieve the thermal shocks and the vibrations. The seal layers is thought to prevent a crack caused by a heat stress from being spread over the whole honeycomb structure, by working as frames of the honeycomb structures to keep the shape of the whole honeycomb structure assembly while ensuring the performances of the respective honeycomb structures as catalyst carriers.

The ceramic particles included in the honeycomb structure are not specifically limited but may be one or multiple types selected among alumina, silica, zirconia, titania, ceria, and mullite particles. Especially preferable is alumina. The amount of the ceramic particles included in the honeycomb structure is preferably in a range of about 30 to 90% by weight, more preferably in a range of about 40 to 80% by weight, and most preferably in a range of about 50 to 75% by weight. The content of the ceramic particles of in a range of about 30 to 90% by weight relatively increases the fraction of the ceramic particles and results in a sufficiently high specific surface area per unit volume of the honeycomb structure and a sufficient dispersion of the catalyst component carried on the honeycomb structure. Meanwhile, the content of the ceramic particles of this range further relatively increases the fraction of the inorganic reinforcing agent and the inorganic binder and prevents lowering of strength of the honeycomb structure.

The inorganic reinforcing agent included in the honeycomb structure is not specifically limited but may be inorganic fibers, whiskers, or inorganic particles. The inorganic fibers may be one or multiple types selected among alumina fibers, silica fibers, silicon carbide fibers, silica alumina fibers, glass fibers, and potassium titanate fibers. The whiskers may be one or multiple types selected among alumina, silica, zirconia, titania, ceria, and mullite whiskers. The inorganic particles may be one or more multiple types selected among alumina, silica, zirconia, silicon carbide, and silicon nitride particles. The selected inorganic particles may be identical with the ceramic particles. It is, however, desirable to select particles having different properties (for example, the particle diameter and the melting temperature) for the inorganic reinforcing agent. The amount of the inorganic reinforcing agent included in the honeycomb structure is preferably in a range of about 3 to 50% by weight, more preferably in a range of about 5 to 40% by weight, and most preferably in a range of about 8 to 30% by weight. The content of the inorganic reinforcing agent in a range of about 3% to 50% by weight desirably prevents lowering of the strength of the honeycomb structure, while increasing the fraction of the ceramic particles, and results in a sufficiently high specific surface area per unit volume of the honeycomb structure and a sufficient dispersion of the catalyst component carried on the honeycomb structure. The aspect ratio (length/width) of the inorganic fibers or/and the whiskers is preferably in a range of about 2 to 1000, more preferably in a range of about 5 to 800, and most preferably in a range of about 10 to 500. The aspect ratio of the inorganic fibers or/and the whiskers in a range about 2 to 1000 desirably heightens the strength of the honeycomb structure, while preventing clogging of a mold, and improves the moldability.

The inorganic binder included in the honeycomb structure is not specifically limited but may be one or multiple types selected among alumina sol, silica sol, titania sol, and water glass. The amount of the inorganic binder included in the honeycomb structure as the solid content is preferably in a range of about 5 to 50% by weight, more preferably in a range of about 10 to 40% by weight, and most preferably in a range of about 15 to 35% by weight. The content of the inorganic binder in a range of about 5% to 50% by weight desirably heightens the strength of the honeycomb structure while keeping the moldability.

Figure 1:
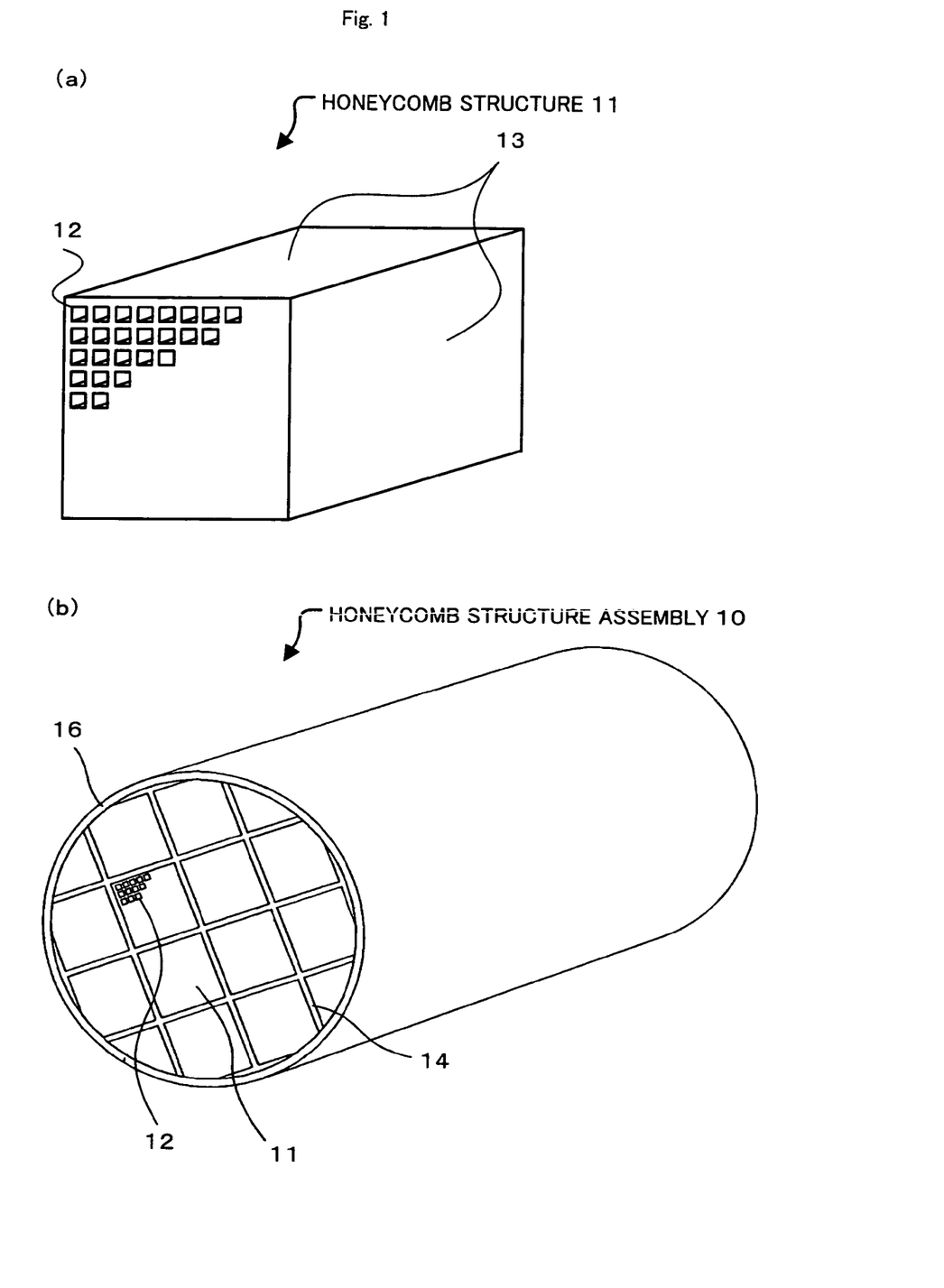
FIGS. 1(a) and 1(b) schematically illustrate a honeycomb structure and a honeycomb structure assembly of the invention.

The shape of the honeycomb structure is not specifically limited but is desirably defined to attain easy joint of adjoining honeycomb structures. The honeycomb structure may have, for example, a square, rectangular, or fan-shaped cross section perpendicular to multiple through holes (hereafter referred to as honeycombed cross section). FIG. 1(a) is a conceptual view illustrating a square-pillar honeycomb structure 11 having a square honeycombed face as one example.

The square-pillar honeycomb structure 11 has a large number of through holes 12 extending in the depth and closed outer faces 13 without through holes 12. The honeycomb structure 11 has a cross section area perpendicular to the through holes (hereafter referred to as honeycombed cross section area) preferably in a range of about 5 to 50 cm$^2$, more preferably in a range of about 6 to 40 cm$^2$, and most preferably in a range of about 8 to 30 cm$^2$. The honeycombed cross section area in a range of about 5 cm$^2$ to 50 cm$^2$ prevents the total cross section area of seal layers for joining multiple honeycomb structures with one another from becoming too large, and thus keeps relatively large specific surface area for catalyst carriage. Meanwhile, the honeycombed cross section area in this range desirably prevents the size of the honeycomb structure from becoming too large and allows for a sufficient control of the potential effects of a heat stress arising in each honeycomb structure. The honeycombed cross section area in the range of about 5 cm$^2$ to 50 cm$^2$ keeps relatively large specific per unit volume and heathen the strength of the honeycomb structure to practical level. The terminology 'aperture ratio' represents a ratio of the total sum of areas of the through holes in the honeycomb structure to the honeycombed cross section area at the honeycombed cross section.

The wall thickness of the wall between adjoining through holes is preferably not greater than about 0.10 to 0.25 mm, more preferably not greater than about 0.10 to 0.22 mm, and most preferably not greater than about 0.10 to 0.20 mm. The wall thickness of in a range of about 0.10 to 0.22 mm ensures the more effective use of the carried catalyst component while keeping the strength of the honeycomb structure. The number of the through holes per unit cross section area is preferably in a range of about 15.5 to 186/cm$^2$ (about 100 to 1200 cpsi), more preferably in a range of about 46.5 to 170.5/cm$^2$ (about 300 to 1100 cpsi), and most preferably in a range of about 62.0 to 155/cm$^2$ (about 400 to 1000 cpsi). The number of the through holes in a range of about 15.5/cm$^2$ to 186/cm$^2$ desirably increases the area of the walls inside the honeycomb structure that are in contact with the exhaust gas, while keeping a low pressure loss and facility of manufacturing the honeycomb structure.

The following describes an example of manufacturing method of the honeycomb structure of the invention. The method first prepares a honeycomb molded object by extrusion molding a material paste, which is mainly composed of the ceramic particles and the inorganic binder. The material paste preferably may additionally include inorganic reinforcing agent. The material paste may further include an organic binder, a dispersion medium, and a molding aid according to the moldability. The organic binder is not specifically limited but may be, for example, one or multiple types selected among methylcellulose, carboxymethylcellulose, hydroxyethylcellulose, polyethyleneglycol, phenol resin, and epoxy resin. The content of the organic binder is preferably in a range of about 1 to 10% by weight relative to the total 100 parts by weight of the ceramic particles and the inorganic binder. When the material paste includes the inorganic reinforcing agent, the content of the organic binder is preferably in a range of about 1 to 10% by weight relative to the total 100 parts by weight of the ceramic particles, the inorganic reinforcing agent, and the inorganic binder. The dispersion medium is not specifically restricted but is, for example, water, an organic solvent, such as benzene, or an alcohol, such as methanol. The molding aid is not specifically restricted but is, for example, polyethyleneglycol, dextrin, fatty acid soap, or polyalcohol.

The method preferably mixes, blends, or kneads the material paste with, for example, a mixer, a blender, an attritor, or a kneader, although this step is not essential and is not restrictive at all. The material paste may be molded to the shape having through holes by any suitable method, for example, by extrusion molding.

The method preferably dries the molded object. A dryer used for this drying step is not specifically restricted but is, for example, a microwave dryer, a hot air dryer, a dielectric dryer, a reduced pressure dryer, a vacuum dryer, or a freeze dryer. The method preferably degreases the molded object. The degreasing conditions are not specifically limited but are appropriately selected according to the types and the amounts of organic substances included in the molded object, for example, 400° C. for 2 hours. The method preferably fires the molded object. The firing conditions are not specifically limited, but the preferable firing temperature is in a range of about 600 to 1000° C. The firing temperature of in a range of about 600° C. to 1000° C. prevents a failure of sintering of the ceramic particles which undesirably lowers the strength of the honeycomb structure. The firing temperature of this range also prevents excessive sintering of the ceramic particles which decreases the specific surface area per unit volume and results in insufficient dispersion of the carried catalyst component. The method accordingly gives the honeycomb structure having the multiple through holes.

Multiple honeycomb structures may successively be joined with one another by means of seal layers made of a sealing paste, be dried, and be immobilized to form a honeycomb structure assembly of a predetermined size. The sealing paste is not specifically restricted but may be a mixture of the inorganic binder and the ceramic particles, a mixture of the inorganic binder and the inorganic reinforcing agent, or a mixture of the inorganic binder, the ceramic particles, and the inorganic reinforcing agent. The sealing paste may further include an organic binder. The organic binder is not specifically limited but may be one or multiple types selected among polyvinyl alcohol, methylcellulose, ethylcellulose, and carboxymethylcellulose.

The thickness of the seal layer for joining adjacent honeycomb structures with each other is preferably in a range of about 0.5 to 2 mm. The thickness of the seal layer in a range of about 0.5 mm to 2 mm gives a sufficient bonding strength. While the seal layer does not function as the catalyst carrier, the thickness of this range prevents specific surface area per unit volume of the honeycomb structure from becoming insufficiently low and allows for a sufficient dispersion of the catalyst component carried on the honeycomb structure. The number of the honeycomb structures joined together may be determined adequately for the desirable size of the honeycomb structure assembly with the catalyst component carried thereon. The honeycomb structures joined together by means of the seal layers may be cut or polished adequately according to the desired size of the honeycomb structure assembly.

The method may apply, dry, and immobilize a coating agent onto the outer circumferential face (side face) of the honeycomb structure assembly without the through holes to form a coating layer. The coating layer desirably protects the outer circumferential face to enhance the strength of the honeycomb structure assembly. The coating agent is not specifically limited but may be identical with or different from the sealing paste. The coating agent may have an identical mixing ratio with or a different mixing ratio from that of the sealing paste. The thickness of the coating layer is not specifically limited but is preferably in a range of about 0.1 to 2 mm. The thickness of the coating layer in a rage of 0.1 mm to 2 mm sufficiently protects the outer circumferential face to enhance the strength of the honeycomb structure assembly, while preventing specific surface area per unit volume of the honeycomb structure assembly from becoming insufficiently low, to allow for a sufficient dispersion of the catalyst component carried on the honeycomb structure assembly. The ratio of the total cross section area of the honeycomb structures to the cross section area of the honeycomb structure assembly is preferably not less than about 85% (more specifically not less than about 90%). The ratio of not less than about 85% prevents excessive increase of the total cross section area of the seal layers, thus increasing the total cross section area of the honeycomb structures and relatively increases the specific surface area for the catalyst carriage.

It is preferable that the assembly of the multiple honeycomb structures joined together by means of the seal layers is preliminarily fired (after formation of the coating layer if any). This preliminary firing step degreases and removes the organic binders that may be included in the sealing paste and the coating agent. The preliminary firing conditions are determined appropriately according to the types and the amounts of the included organic substances, for example, 700° C. for 2 hours. The preliminary firing of the honeycomb structure assembly effectively prevents release of the exhaust gas polluted with the remaining organic binders. FIG. 1(b) is a conceptual view illustrating a cylindrical honeycomb structure assembly 10, which is obtained by joining plurality of the square-pillar honeycomb structures 11 (see FIG. 1(a)) having the square cross section. The method of manufacturing the honeycomb structure assembly 10 joins plurality of the honeycomb structures 11 together by means of seal layers 14, cuts and polishes the joined assembly to a cylindrical shape, and coats the outer circumferential face of the cylindrical assembly without the through holes 12 to form a coating layer 16. The cutting and polishing step may be omitted from the manufacturing process of a honeycomb structure assembly in a predetermined shape (for example, the cylindrical honeycomb structure assembly 10 shown in FIG. 1(b)) by molding different shapes of the honeycomb structures 11 having fan-shaped cross sections and square cross sections and joining the honeycomb structures 11 of the different shapes together.

The application of the honeycomb structure is not specifically limited, but the honeycomb structure is preferably used as a catalyst carrier for conversion of the exhaust gas of the vehicle. In the application as a catalyst carrier for conversion of the exhaust gas of a Diesel engine, the honeycomb structure of the invention may be combined with a Diesel particulate filter (DPF), which has a ceramic honeycomb structure of, for example, silicon carbide and functions to filter out and combust particulate materials (PM) included in the exhaust gas. The honeycomb structure of the invention may be located in the upstream of or in the downstream of the DPF. In the arrangement of the honeycomb structure of the invention in the upstream, the heat generated by an exothermic reaction in the upstream honeycomb structure is transmitted to the downstream DPF to accelerate a temperature increase for regeneration of the DPF. In the arrangement of the honeycomb structure of the invention in the downstream, on the other hand, the upstream DPF filters out the PM included in the exhaust gas and prevents clogging of the through holes in the downstream honeycomb structure of the invention. The downstream honeycomb structure of the invention treats the gas component generated by incomplete combustion of the PM in the upstream DPF.

Carriage of a catalyst component on the honeycomb structure gives a honeycomb catalyst. The catalyst component is not specifically limited but may include one or multiple selected among noble metals, alkali metals, alkaline earth metals, and oxides. Typical examples of the noble metal include platinum, palladium, and rhodium. Typical examples of the alkali metal include potassium and sodium. The alkaline earth metal is, for example, barium. The oxide may be perovskite (for example, $La_{0.75}K_{0.25}MnO_3$) or $CeO_2$. The application of the honeycomb catalyst is not specifically restricted, but the honeycomb catalyst is preferably used, for example, as a three-way catalyst or a NOx storage catalyst for is conversion of the exhaust gas of the automobile. The carriage of the catalyst component may be executed at any suitable timing. For example, the catalyst component may be carried after manufacture of the honeycomb structure or may be carried on the ceramic particles of the material paste. The catalyst component may be carried on each honeycomb structure prior to assembly of multiple honeycomb structures to a honeycomb structure assembly. The catalyst component may otherwise be carried after assembly of multiple honeycomb structures to a honeycomb structure assembly. The method of carriage of the catalyst component is not specifically restricted but is, for example, impregnation.

Figure 2:
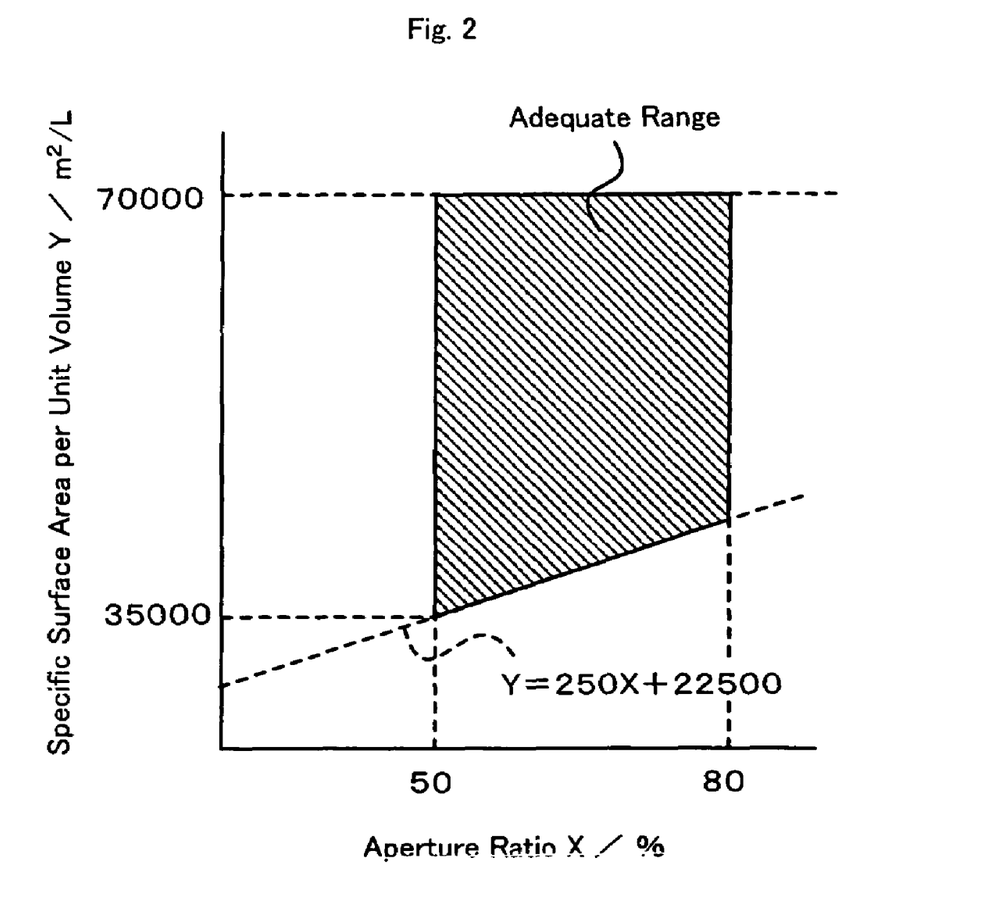
FIG. 2 is a graph showing an adequate range of a specific surface area per unit volume against an aperture ratio.

The specific surface area per unit volume of the honeycomb structure is preferably at least about 35,000 $m^2/L$ and is in the range defined by Equation (1) given above. This arrangement ensures sufficiently high dispersion of the catalyst component carried over the whole honeycomb structure. The specific surface area per unit volume is preferably not greater than about 70,000 $m^2/L$ by taking into account the limit of dispersion of the catalyst component (for example, platinum). An adequate range of the specific surface area per unit volume against the aperture ratio is shown in FIG. 2. It is desirable that the honeycomb structure is included in the adequate range of FIG. 2. The specific surface area per unit volume is calculated by Equation (2) given below.

The specific surface area per unit volume is defined more specifically. The procedure first determines a volume (L) of the material of the honeycomb structure except volumes of the through holes of the honeycomb structure and calculates a ratio A (% by volume) of the volume of the material of the honeycomb structure to the total volume of the whole honeycomb structure (apparent volume). The procedure then measures a BET specific surface area per unit weight of the honeycomb structure B ($m^2/g$) The BET specific surface area is measured according to a BET one point method in conformity with Japanese Industrial Standards JIS-R-1626 (1996). Each sample piece is cut into a cylindrical shape (15 mm$\phi$×15 mm) for this measurement. The procedure then computes an apparent density C (g/L) of the honeycomb structure from the weight and the apparent volume of the honeycomb structure and calculates a specific surface area per unit volume of the honeycomb structure S ($m^2/L$) according to Equation (2) given below. The specific surface area per unit volume of the honeycomb structure represents the specific surface area per apparent volume of the honeycomb structure.

$$S(m^2/L)=A(\% \text{ by volume})/100 \times B(m^2/g) \times C(g/L) \quad (2)$$

The specific surface area per unit volume of the honeycomb structure is varied by regulating the firing temperature and the firing time of the honeycomb structure. The lower firing temperature does not promote sintering of the material of the honeycomb structure and thereby gives the honeycomb structure having a higher specific surface area per unit volume. The shutter firing time enhances this effect and further increases the specific surface area per unit volume of the honeycomb structure. The higher firing temperature promotes sintering of the material of the honeycomb structure and thereby gives the honeycomb structure having a lower specific surface area per unit volume. The longer firing time enhances this effect and further decreases the specific surface area per unit volume of the honeycomb structure. The smaller granularity of the material of the honeycomb structure promotes sintering of the material at an identical firing temperature. The specific surface area per unit volume is thus also adjustable by regulating the granularity of the material. Addition of a sintering aid enhances this effect to adjust the specific surface area per unit volume. The sintering aid is not specifically limited but should be molten at a lower temperature than the firing temperature of the honeycomb structure.

BRIEF DESCRIPTION OF THE DRAWINGS

FIG. 3 is a table showing preparation conditions in examples of the invention and comparative examples;

FIG. 6 is a table showing measurement results of examples of the invention and comparative examples;

EXAMPLES

Some modes of carrying out the invention are described below as preferred examples.

The following description regards examples of honeycomb catalysts obtained by making a catalyst component carried on honeycomb structures manufactured under various conditions, as well as their comparative examples.

Example 1

The process of Example 1 mixed 40% by weight of γ-alumina particles (average particle diameter: 2 μm), 10% by weight of silica alumina fibers (average fiber diameter: 10 μm, average fiber length: 100 μm), and 50% by weight of silica sol (solid content: 30% by weight) to give a mixture. The process added 6 parts by weight of methylcellulose as an organic binder and small amounts of a plasticizer and a lubricant with stirring to 100 parts by weight of the mixture and sufficiently kneaded the whole mixed composition. The mixed composition was extrusion molded by an extruder to a raw molded object. The raw molded object was sufficiently dried with a microwave dryer and a hot air dryer and was kept at 400° C. for 2 hours for degreasing. The degreased molded object was fired at 800° C. for 2 hours to give a square-pillar honeycomb structure (34.3 mm×34.3 mm×150 mm) having a cell density of 62 cells/$cm^2$ (400 cpsi) and a wall thickness of 0.25 mm.

The honeycomb structure thus obtained was soaked in a platinum nitrate solution to carry platinum as the catalyst component at a weight of 2 g/L per unit volume of the honeycomb structure and was kept at 600° C. for 1 hour. This gave a honeycomb catalyst with the catalyst component carried thereon (Example 1). The ceramic particle composition, the wall thickness, the aperture ratio, the dimensions, the cell density, the firing temperature, and the firing time of the honeycomb structure in the honeycomb catalyst of Example 1 are shown in the table of FIG. 3. The table of FIG. 3 also shows the specifications of Examples 2 to 12 and Comparative Examples 1 to 14 described below.

Example 2 to 12

Honeycomb structures of Examples 2 to 12 having wall thicknesses, aperture ratios, and cell densities shown in the table of FIG. 3 were obtained from the same starting materials mixed at the same mixing ratio as those of Example 1 by the same procedure as Example 1 under respective preparation conditions shown in the table of FIG. 3. These honeycomb structures were treated by the same procedure as Example 1 to carry the catalyst component thereon. This gave honeycomb catalysts of Examples 2 to 12.

Comparative Example 1 to 7 and Comparative Examples 9 to 14

Honeycomb structures of Comparative Examples 1 to 7 and 9 to 14 having wall thicknesses, aperture ratios, and cell densities shown in the table of FIG. 3 were obtained from the same starting materials mixed at the same mixing ratio as those of Example 1 by the same procedure as Example 1 under respective preparation conditions shown in the table of FIG. 3. These honeycomb structures were treated by the same procedure as Example 1 to carry the catalyst component thereon. This gave honeycomb catalysts of Comparative Examples 1 to 7 and 9 to 14.

Comparative Example 8

A commercially available cylindrical cordierite honeycomb structure (143.8 mm$\phi$ in diameter×150 mm in height), which had alumina as a catalyst carrier layer inside through holes, was cut into a square-pillar shape (34.3 mm×34.3 mm×150 mm). This honeycomb structure was treated by the same procedure as Example 1 to carry the catalyst component thereon. This gave a honeycomb catalyst of Comparative Example 8. The honeycomb structure of the obtained honeycomb catalyst had hexagonal cells at a cell density of 62 cells/cm$^2$ (400 cpsi), a wall thickness of 0.25 mm, and an aperture ratio of 56%.

[Measurement of Specific Surface Area]

With regard to Examples 1 to 12 and Comparative Examples 1 to 14, the specific surface area per unit volume of each honeycomb structure was measured prior to carriage of the catalyst component. The measurement process first determined a volume (L) of a component material of the honeycomb structure except volumes of through holes of the honeycomb structure and calculated a ratio A (% by volume) of the volume of the component material of the honeycomb structure to the total volume of the whole honeycomb structure (apparent volume). The measurement process then measured a BET specific surface area per unit weight of the honeycomb structure B (m$^2$/g). The BET specific surface area was measured with a BET measurement device (Micromeritics Flow Sorb II-2300 manufactured by Shimadzu Corporation) according to a BET one point method in conformity with Japanese Industrial Standards JIS-R-1626 (1996). The content of Japanese Industrial Standards JIS-R-1626(1996) is incorporated herein by reference in their entity. Each cylindrical sample piece (15 mm$\phi$×15 mm) was used for the measurement. The measurement process then computed an apparent density C (g/L) of the honeycomb structure from the weight and the apparent volume of the honeycomb structure and calculated a specific surface area per unit volume of the honeycomb structure S (m$^2$/L) according to Equation (2) given above. The specific surface area per unit volume of the honeycomb structure was approximately equal to the specific surface area per unit volume of the honeycomb catalyst obtained by making the catalyst component carried on the honeycomb structure.

[Measurement of Light-Off Temperature]

The light-off temperature represents a reaction temperature that gives a conversion efficiency of 50%. Here the conversion efficiency represents a decrease rate of the concentration of a specific component included in the exhaust gas by the function of the catalyst. The lower light-off temperature means successful conversion of the exhaust gas composition with less energy. The honeycomb catalyst having the lower light-off temperature accordingly has the higher catalytic performance. The light-off temperature is thus usable as an index showing the catalytic performance of the honeycomb catalyst. The light-off temperature is measured with a catalyzed reaction system 20 shown in FIG. 4. The catalyzed reaction system 20 includes a diluted gas supply unit 21 that feeds a diluted gas of the air and nitrogen, a flow path 22 that makes a flow of the diluted gas to the honeycomb structure, a humidifier 23 that humidifies the diluted gas, a heater 24 that heats the diluted gas, a gas blender 25 that blends the exhaust gas composition with the heated diluted gas to prepare a reactive gas, a sample holder 26 that holds the honeycomb structure in an air-tight manner, a gas sampler 27 that samples the reactive gas prior to contact with the honeycomb structure, a gas sampler 28 that samples the reactive gas after contact with the honeycomb structure, and a gas analyzer 29 that analyzes the concentration of a specific gas component included in the reactive gas.

Figure 4:
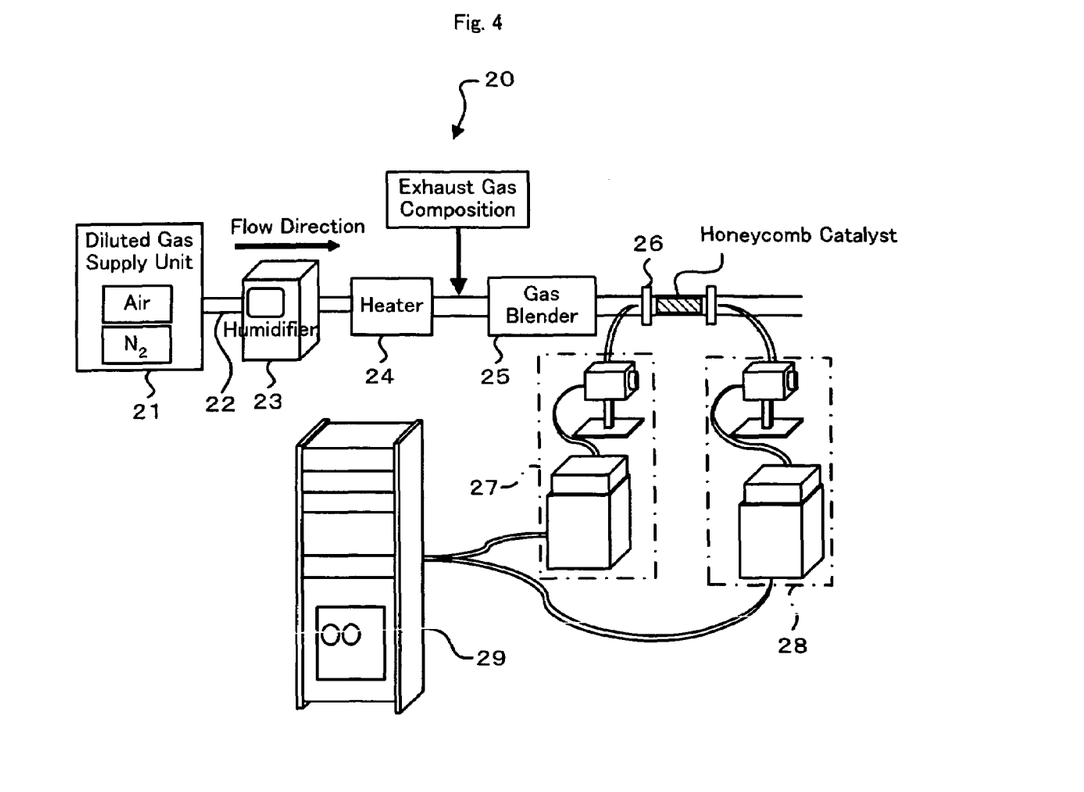
FIG. 4 schematically illustrates a catalyzed reaction system.

The measurement process first set the honeycomb catalyst in the sample holder 26 and activated the diluted gas supply unit 21 to make a flow of the diluted gas of the air and nitrogen at a preset flowrate through the flow path 22. The measurement process then activated the humidifier 23 to humidify the diluted gas and adjusted the temperature of the diluted gas to a preset level by the heater 24. The measurement process subsequently introduced the exhaust gas composition in the upstream of the gas blender 25 onto the flow of the diluted gas and mixed the exhaust gas composition with the diluted gas to prepare a reactive gas of a preset concentration in the gas blender 25. The prepared reactive gas was brought into contact with the honeycomb catalyst to be converted. During conversion of the reactive gas, the setting of the heater 24 was varied. The temperature of the reactive gas inside the honeycomb structure at each heater setting was measured with a thermocouple (not shown). The concentrations of the is reactive gases sampled by the gas samplers 27 and 28 were measured by the gas analyzer 29.

Each sample of the honeycomb catalysts in Examples 1 to 12 and Comparative Examples 1 to 14 for measurement of the light-off temperature had dimensions of 34.3 mm square×150 mm. The flow rate of the reactive gas for the catalyzed reaction was 131 (L/min). The exhaust gas composition included oxygen, carbon monoxide, sulfur dioxide, hydrocarbons, nitrogen monoxide, steam, and nitrogen. The reactive gas had an oxygen concentration of 13%, a carbon monoxide concentration of 300 ppm, a sulfur dioxide concentration of 8 ppm, a hydrocarbon concentration of 200 ppm-C on the carbon base, and a nitrogen monoxide concentration of 160 ppm. The reactive gas was humidified to have a slightly increased weight. The temperature of the heater 14 was varied by 10° C. each to change the reaction temperature in a range of 50 to 400° C. Among the components of the reactive gas, the concentrations of carbon monoxide and hydrocarbons were measured by the gas analyzer 29. The conversion efficiency was calculated according to Equation (3) given below:

$$\text{Conversion Efficiency (\%)}=(C0-Ci)/C0\times100 \qquad (3)$$

where C0 denotes the concentration of the reactive gas component prior to contact with the catalyst and Ci denotes the concentration of the reactive gas component after contact with the catalyst.

The measurement process then set the temperature of the reactive gas inside the honeycomb catalyst to the reaction temperature and obtained a variation in conversion efficiency against the reaction temperature. The conversion efficiency was plotted as ordinate and the reaction temperature was plotted as abscissa. The temperature giving the conversion efficiency of 50% was read from the plot and was set to the light-off temperature.

[Measurement Results]

Figure 5:
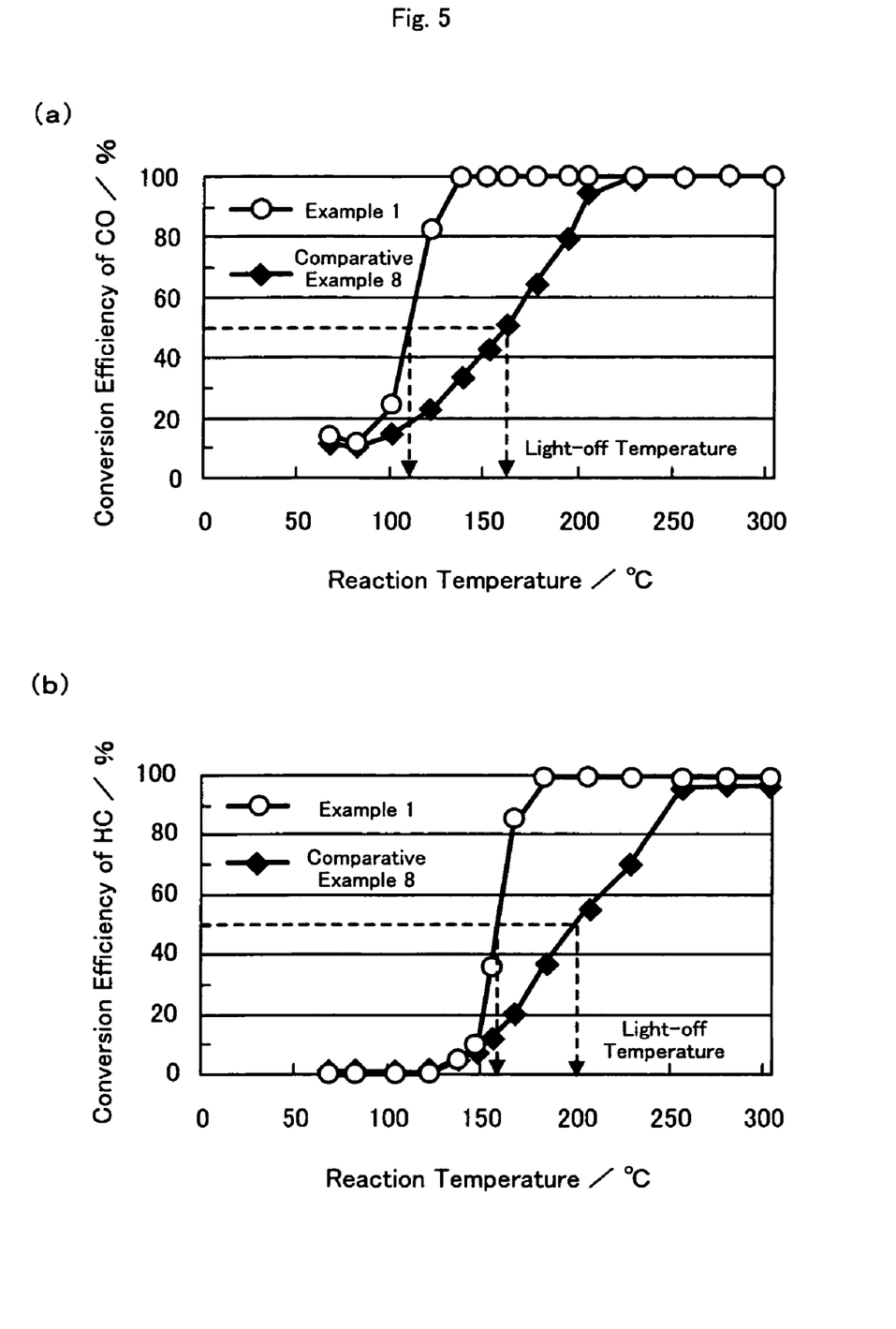
FIGS. 5(a) and 5(b) are graphs showing variations in catalytic conversion efficiencies of carbon monoxide and hydrocarbons against reaction temperature.

The graph of FIG. 5(a) shows variations in conversion efficiency of carbon monoxide against the reaction temperature with regard to Example 1 and Comparative Example 8. The graph of FIG. 5(b) shows variations in conversion efficiency of hydrocarbons against the reaction temperature with regard to Example 1 and Comparative Example 8. As shown in FIG. 5(a), the conversion efficiency of Example 1 abruptly increased after a certain temperature level and reached 100% at 140° C. The conversion efficiency of Comparative Example 8 did not abruptly increase and reached 100% at a higher temperature than the temperature of Example 1. The similar tendency was observed with regard to the conversion efficiency of hydrocarbons as shown in FIG. 5(b). These measurement results show that the honeycomb catalyst of Example 1 converts carbon monoxide and hydrocarbons at lower temperatures. Namely the honeycomb catalyst of Example 1 has the higher catalytic performance. The light-off temperatures were obtained as shown by the dotted arrows in the respective graphs of FIGS. 5(a) and 5(b). The light-off temperatures were similarly obtained for the other samples.

Figure 7:
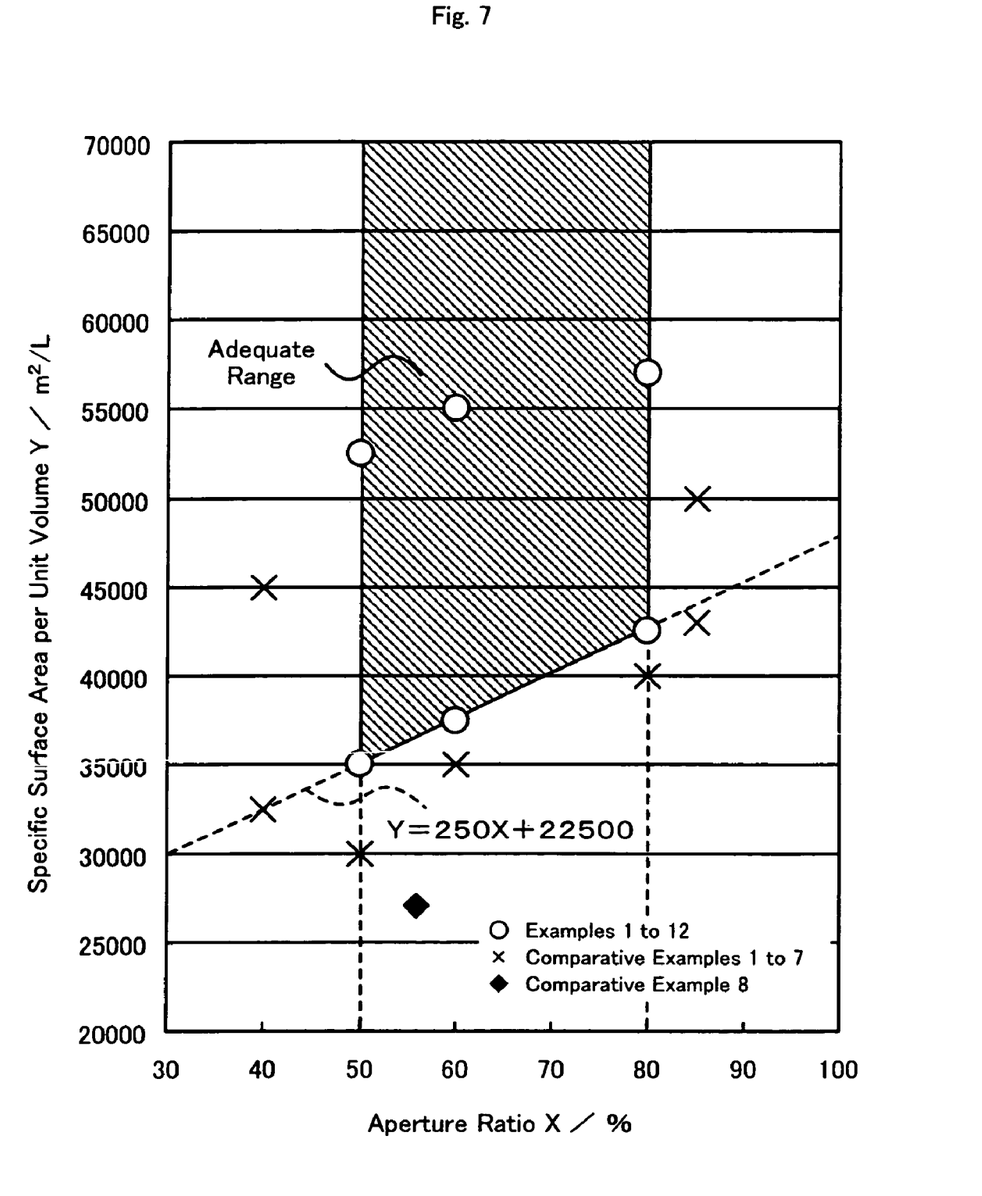
FIG. 7 is a graph showing plots of the specific surface area per unit volume against the aperture ratio.

The table of FIG. 6 shows the measurement results of the respective samples, the wall thickness, the aperture ratio X, the specific surface area per unit volume Y, the calculation of $250 \times X+22500$, and the light-off temperature. The graph of FIG. 7 shows the plots of the aperture ratio of Examples 1 to 12 and Comparative Examples 1 to 8 having the wall thickness of not greater than 0.25 mm as abscissa and the specific surface area per unit volume as ordinate. As clearly understood from this graph, the plots of all the Examples of the invention are included in the adequate range defined in FIG. 2. The linear approximation of the three plots of Examples 2 to 4 by the least-square method gives Equation (4), where the aperture ratio X (%) and the specific surface area per unit volume Y ($m^2/L$) as variables:

$$Y=250\times X+22500 \qquad (4)$$

As clearly shown in FIGS. 6 and 7, the preferable range of the aperture ratio X is $50 \leq X \leq 80$. Combination of the preferable range of the aperture ratio X with Equation (4) defines the adequate range as:

$$Y \geq 250 \times X+22500 (50 \leq X \leq 80) \qquad (1)$$

The honeycomb structure having the wall thickness of not greater than 0.25 mm and satisfying Relation (1) given above has the high catalytic performance.

[Honeycomb Structure Assembly]

Figure 8:
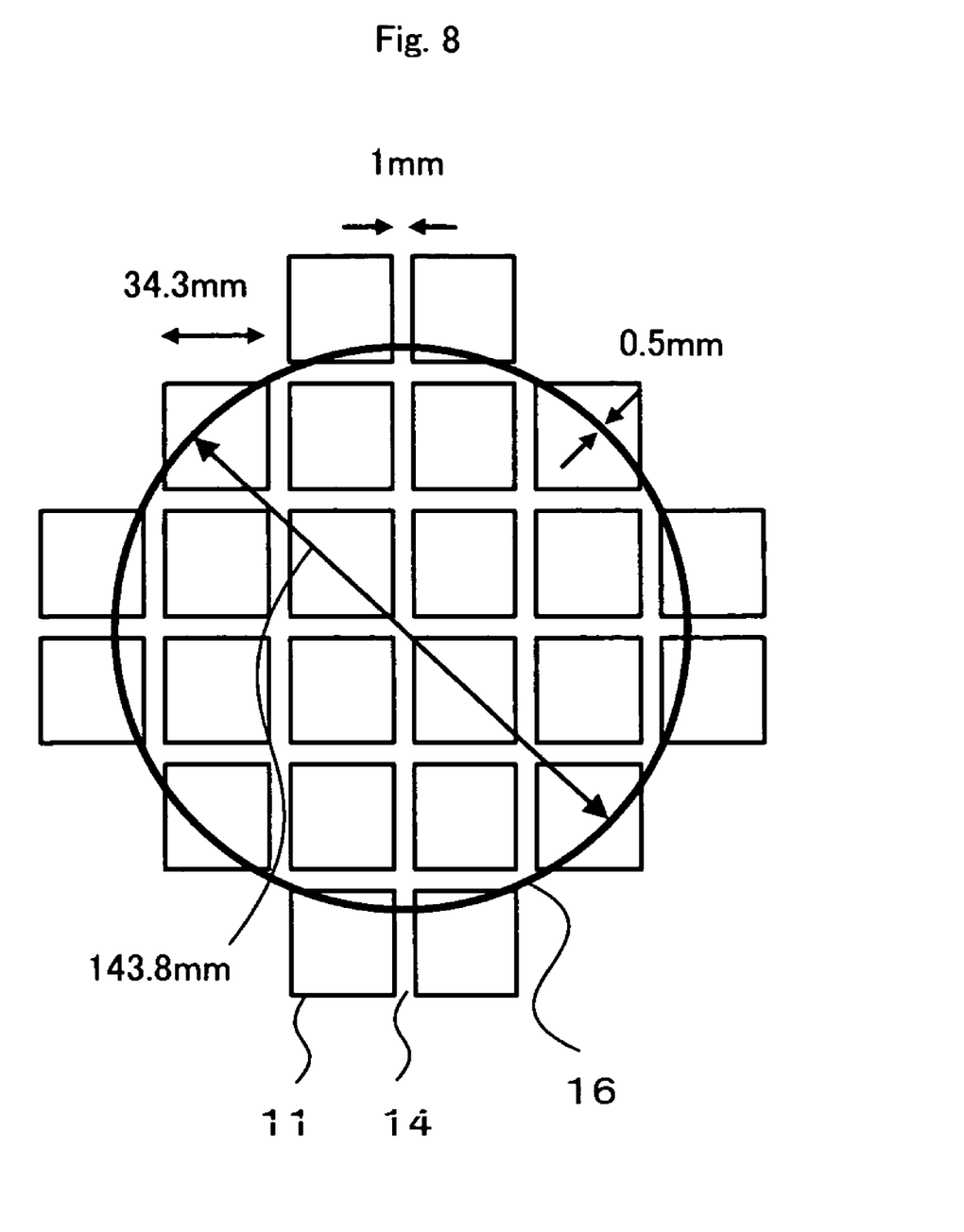
FIG. 8 schematically illustrates a honeycomb structure assembly obtained by assembling multiple honeycomb structures.

A heat-resisting sealing paste was prepared by mixing 29% by weight of γ-alumina particles (average particle diameter: 2 μm), 7% by weight of silica alumina fibers (average fiber diameter: 10 μm, average fiber length: 100 μm), 34% by weight of silica sol (solid content: 30% by weight), 5% by weight of carboxymethylcellulose, and 25% by weight of water. Multiple honeycomb structures in each of Examples 1 to 12 prior to carriage of the catalyst component were joined with one another by the sealing paste to form respective honeycomb structure assemblies. FIG. 8 is a conceptual view of a honeycomb structure assembly, which is obtained by joining multiple honeycomb structures 11 and is seen from a honeycombed face perpendicular to through holes. The sealing paste was applied on the outer faces 13 of each honeycomb structure 11 to form the seal layers 14 of 1 mm in thickness, and the multiple honeycomb structures 11 with the seal layers 14 were joined with one another and were immobilized to form each honeycomb structure assembly. Each honeycomb structure assembly was cut with a diamond cutter into a cylindrical shape having a practically symmetric front face with respect to a point. The cylindrical outer surface of the cylindrical honeycomb structure assembly except the honeycombed face perpendicular to the through holes 12 was coated with the sealing paste in a thickness of about 0.5 mm. The cylindrical honeycomb structure assembly was dried at 120° C. and was kept at 700° C. for 2 hours for degreasing of the seal layer and the coating layer. This gave the cylindrical honeycomb structure assembly 10 (143.8 mmϕ in diameter× 150 mm in height) (see FIG. 1(b)). The honeycomb structure assembly 10 was treated by the same procedure as Example 1 to carry the catalyst component thereon. This completed the honeycomb structure assembly with the catalyst component carried thereon.

What is claimed is:

1. A honeycomb structure comprising:
   a ceramic medium;
   multiple through holes extending longitudinally through the ceramic medium,
   wherein a wall thickness of each wall between adjoining through holes is not greater than about 0.25 mm, and a relation of Y>250×X+22500, (50<X<80) is satisfied, where X (%) denotes an aperture ratio of a honeycombed face of said honeycomb structure perpendicular to the multiple through holes and Y ($m^2/L$) denotes a specific surface area per unit volume of said honeycomb structure.

2. A honeycomb structure in accordance with claim 1, wherein the wall thickness is not less than about 0.10 mm.

3. A honeycomb structure in accordance with claim 1, wherein the wall thickness is not more than about 0.25 mm.

4. A honeycomb structure in accordance with claim 1, wherein number of the through holes per unit cross section area is about 15.5 to 186/$cm^2$.

5. A honeycomb structure in accordance with either one of claims 1 and 2, said honeycomb structure comprising at least ceramic particles and an inorganic binder.

6. A honeycomb structure in accordance with claim 5, said honeycomb structure comprising about 30 to 90% by weight of the ceramic particles and about 5 to 50% by weight of the inorganic binder as a solid content.

7. A honeycomb structure in accordance with claim 1, wherein the specific surface area per unit volume is not less than about 35,000 $m^2/L$ and not greater than about 70,000 $m^2/L$.

8. A honeycomb catalyst, wherein a catalyst component is carried on a honeycomb structure in accordance with claim 1.

9. A honeycomb catalyst in accordance with claim 8, wherein the catalyst component includes at least one selected among noble metals, alkali metals, alkaline earth metals, and oxides.

10. A honeycomb catalyst in accordance with claim 8, said honeycomb catalyst comprising a part of an exhaust gas converter of a vehicle.

11. A honeycomb structure assembly, comprising: at least two honeycomb structures in accordance with claim 1; and at least one seal layer that joins adjacent honeycomb structures with each other via respective closed outer faces of said honeycomb structures that are different from respective honeycombed faces of said honeycomb structures perpendicular to the multiple through holes.

12. A honeycomb structure assembly in accordance with claim 11, wherein each seal layer has a thickness in a range of about 0.5 to 2 mm.

13. A honeycomb catalyst, wherein a catalyst component is carried on a honeycomb structure assembly in accordance with claim 11.

14. A honeycomb catalyst in accordance with claim 13, wherein the catalyst component includes at least one selected among noble metals, alkali metals, alkaline earth metals, and oxides.

15. A honeycomb catalyst in accordance with claim 13, said honeycomb catalyst comprising a part of an exhaust gas converter of a vehicle.

* * * * *